April 8, 1924.

K. SCHMIDT 1,490,031

CIRCUIT ARRANGEMENT FOR GENERATING PURE CONTINUOUS CURRENTS

Filed July 26, 1920

INVENTOR
KARL SCHMIDT
BY
ATTORNEYS

Patented Apr. 8, 1924.

1,490,031

UNITED STATES PATENT OFFICE.

KARL SCHMIDT, OF BERLIN, GERMANY, ASSIGNOR TO C. LORENZ AKTIENGESELLSCHAFT, OF LORENZWEG, BERLIN-TEMPELHOF, GERMANY.

CIRCUIT ARRANGEMENT FOR GENERATING PURE CONTINUOUS CURRENTS.

Application filed July 26, 1920. Serial No. 399,189.

*To all whom it may concern:*

Be it known that I, KARL SCHMIDT, engineer, residing at Berlin, Germany, have invented certain new and useful Improvements in Circuit Arrangements for Generating Pure Continuous Currents, for which I have filed an application in Germany, Feb. 13, 1919, of which the following is a specification.

To obtain a current which is quite continuous and therefore suitable for the satisfactory operation of microphones in connection with telephone exchanges or for producing undamped electrical oscillations by means of audions for the wireless transmission of signals, it is usual to employ batteries, more particularly accumulator batteries, because hitherto it has been impossible to generate an absolutely continuous current, i. e. a continuous current free from alternating current harmonics, with machines. For it is well known that in generating continuous current by dynamos alternating currents arise which are very troublesome, particularly in a highly sensitive alternating current instrument like a telephone receiver, in which they cause disturbing noises. The impossibility of producing an absolutely continuous current by a machine is due to the oscillations caused by the commutator of the machine, by irregularities arising from its magnetic field, as by pulsations caused by its armature teeth, and by changes in the field during the running of the machine etc.

The alternating current harmonics which thus occur can be damped to a certain extent by connecting condensers in parallel with the source of current or by connecting choking coils in series therewith. But these measures are not sufficient to render a dynamo suitable for the direct supply of current to microphones or audions.

The larger the condensers are that are connected in parallel to the machine the smaller the harmonic waves will be. But the latter would only disappear altogether if an infinitely large capacity were used, because the condenser would then have the effect of a short circuit on these alternating current waves.

The object of the present invention is to provide a method of producing a pure continuous current, i. e. a continuous current without any superimposed alterating currents, with the aid of a current supplying source, such as a machine, that of itself does not generate or supply a pure continuous current.

The invention will be explained with reference to the accompanying drawing in which—

Figure 1:
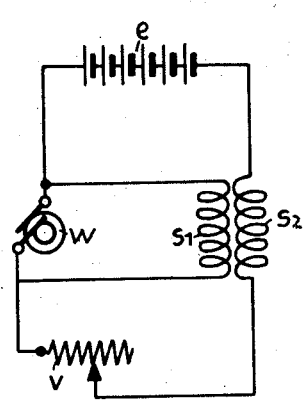
Figure 2:
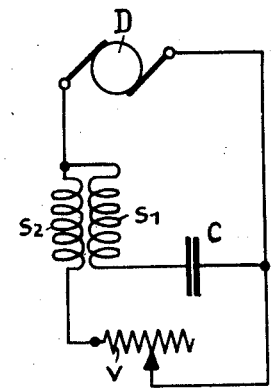
Figure 3:
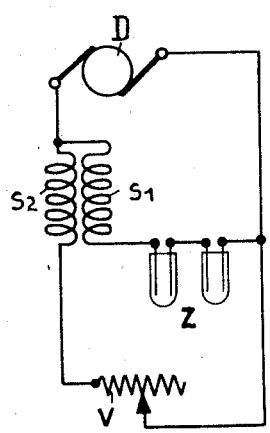
Figure 4:
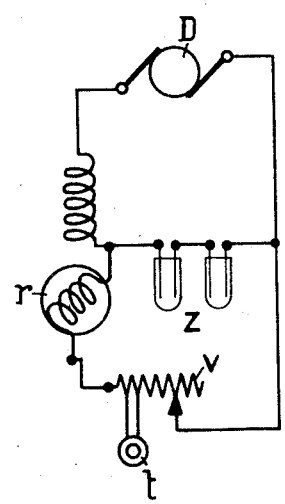

Fig. 1 illustrates the elements in a fundamental circuit according to the invention, Fig. 2 shows how certain imperfections of the circuit of Fig. 1 may be eliminated, Fig. 3 illustrates a practical form of circuit arrangement and Fig. 4 represents a modification of Fig. 3.

If a source of continuous current $e$ be connected in series with a source of alternating current $w$ (Fig. 1) a pulsating current will flow through the current consuming apparatus $v$, which may be supposed to represent a microphone. This pulsating current is unsuitable for telephonic transmission and can be converted into a continuous current by employing a transformer $s^1$, $s^2$ whose primary winding $s^1$ is connected to the terminals of the alternating current generator $w$ and whose secondary coil $s^2$ is connected in series with the supply circuit. The latter coil $s^2$ must be so connected that the voltage induced in it opposes the potential of the machine. The sum of the alternating voltages produced will then be zero.

A means is thus provided which enables machines to be employed for supplying current in plants in which only pure continuous currents are applicable, this means consisting in balancing the alternating currents produced by the machine with the aid of counteracting alternating potentials.

In accordance with the invention the application of this principle in electric circuits is governed by the following considerations:

A continuous current machine is a current generator which exercises the effect partly of an accumulator and partly of an alternating current dynamo. If the alternating current is to be eliminated from a continuous current machine the primary coil of the transformer of Fig. 1 cannot be connected directly to the terminals of the dynamo because this primary coil would then form a short circuit on the continuous current side of the transformer. This drawback could be removed to a certain extent by inserting a condenser $c$ in the circuit in the manner indicated Fig. 2. In this circuit arrangement both the alternating and continuous currents are assumed to be generated by a dynamo. But to obtain practical results the condensers would have to be very large so that only a small difference of phase will result.

If in contradistinction to the arrangement illustrated in Fig. 2 the practical generation of a pure continuous current is to be rendered perfectly feasible, the condenser will have to be substituted by a battery of primary or secondary cells, or of polarization cells.

The voltage of this continuous current battery ($z$ in Fig. 3) must be equal to the voltage of the dynamo. The effect of the battery is similar to that of an infinitely large condenser. Hence, if the voltages of the two continuous current sources are equal, the only current flowing will be the no-load current of the transformer $s^1$, $s^2$. In order to render it possible to obtain a perfect balance of the voltages in any circuit a choking coil of variable inductance is preferably connected in series with the battery, which may consist of accumulators. The battery and choking coils may also be replaced by a variable ohmic resistance.

The result produced by this means is that practically no alternating current will flow in the supplied circuit, i. e. in the apparatus $v$ which consumes current. It will however, still be possible for a certain amount of alternating current voltage to be produced through the drop of the voltage of the no-load current due to the ohmic resistance of the battery $z$. This drop of voltage can, however, easily be compensated for by changing the ratio of transformation of the transformer, which may be effected, for example, by a coil that is coupled with the field of the transformer. Such an arrangement is shown in Figure 4 of the drawings, in which $r$ is a coil coupled with the transformer shown. The coil $r$ is adjustable. By moving this coil $r$ (Fig. 4), the disturbing alternating current can be made to sink so low as to be zero for all practical purposes, i. e. It is possible to ascertain by means of the telephone receiver $t$, that is connected in parallel to a portion of the continuous current load $v$, when the disturbing current in the circuit ceases to flow.

The most important result achieved by the invention is that it renders it possible to generate an absolutely pure continuous current by means of a machine through eliminating the harmonics from the machine circuit to an extent that is perfect for all practical purposes. Hence it will be particularly employed in connection with the transmission of signals, as for example in connection with machines in telephone exchanges, and in wireless telegraph and telephone plants operating with the aid of high frequency generators whose source of current have to supply a pure continuous current, as required in connection with audions or relays without inertia. But the application of the invention is, of course, not limited to plants of this kind.

Since the entire continuous current supplied flows through the counter-voltage transformer it is advantageous to provide an air gap in the magnetic circuit of the transformer in order to prevent the iron from being saturated beyond a certain limit by the continuous current and to oppose the free formation of an alternating current field.

I claim:

1. Means for producing a pure continuous current, comprising a direct current generating machine, a circuit for supplying current from the machine, a transformer in series with the supply circuit, a magnetizing circuit for the transformer, and a choking coil with variable inductance for affecting the said magnetizing circuit.

2. Means for producing a pure continuous current, comprising a direct current generating machine, a circuit for supplying current from the machine, an autotransformer in series with the supply circuit, a magnetizing circuit for the transformer, and a choking coil with variable inductance for affecting the said magnetizing circuit.

3. Means for producing a pure continuous current, comprising a direct current generating machine, a circuit for supplying current from the machine, a transformer so connected with the said circuit that its induced voltage is opposed to the voltage of the machine, and a choking coil for affecting the magnetization of the transformer, the choking coil being adapted to be displaced in the magnetic field of the transformer.

4. Means for producing a pure continuous current, comprising a direct generating machine, a circuit for supplying current from the machine, a transformer in series with the supply circuit, a magnetizing circuit for the transformer, and a choking coil for affecting the magnetization of the transformer, the choking coil being adapted to be displaced in the magnetic field of the transformer.

5. Means for producing a pure continuous current, comprising a direct current generating machine, a circuit for supplying current from the machine, an autotransformer in series with the supply circuit, a magnetizing circuit for the autotransformer, and a choking coil for affecting the magnetization of the transformer, the choking coil being adapted to be displaced in the magnetic field of the transformer.

6. Means for producing a pure continuous current, comprising a direct current generating machine, a circuit for supplying current from the machine, a transformer so connected with the said circuit that its induced voltage is opposed to the voltage of the machine, and the transformer being provided with an iron magnetic circuit with an air gap.

7. Means for producing a pure continuous current, comprising a direct current generating machine, a circuit for supplying current from the machine, a transformer so connected with the said circuit that its induced voltage is opposed to the voltage of the machine, a choking coil for affecting the magnetization of the transformer, and the transformer being provided with an iron magnetic circuit with an air gap.

In testimony whereof I have signed this specification in the presence of two witnesses.

KARL SCHMIDT.

Witnesses:
FRITZ WARSCHAUER,
KAPPE LECEK.